June 10, 1924.
T. H. THOMAS
1,496,955
AUTOMATIC TRAIN SPEED CONTROL APPARATUS
Filed July 14, 1923
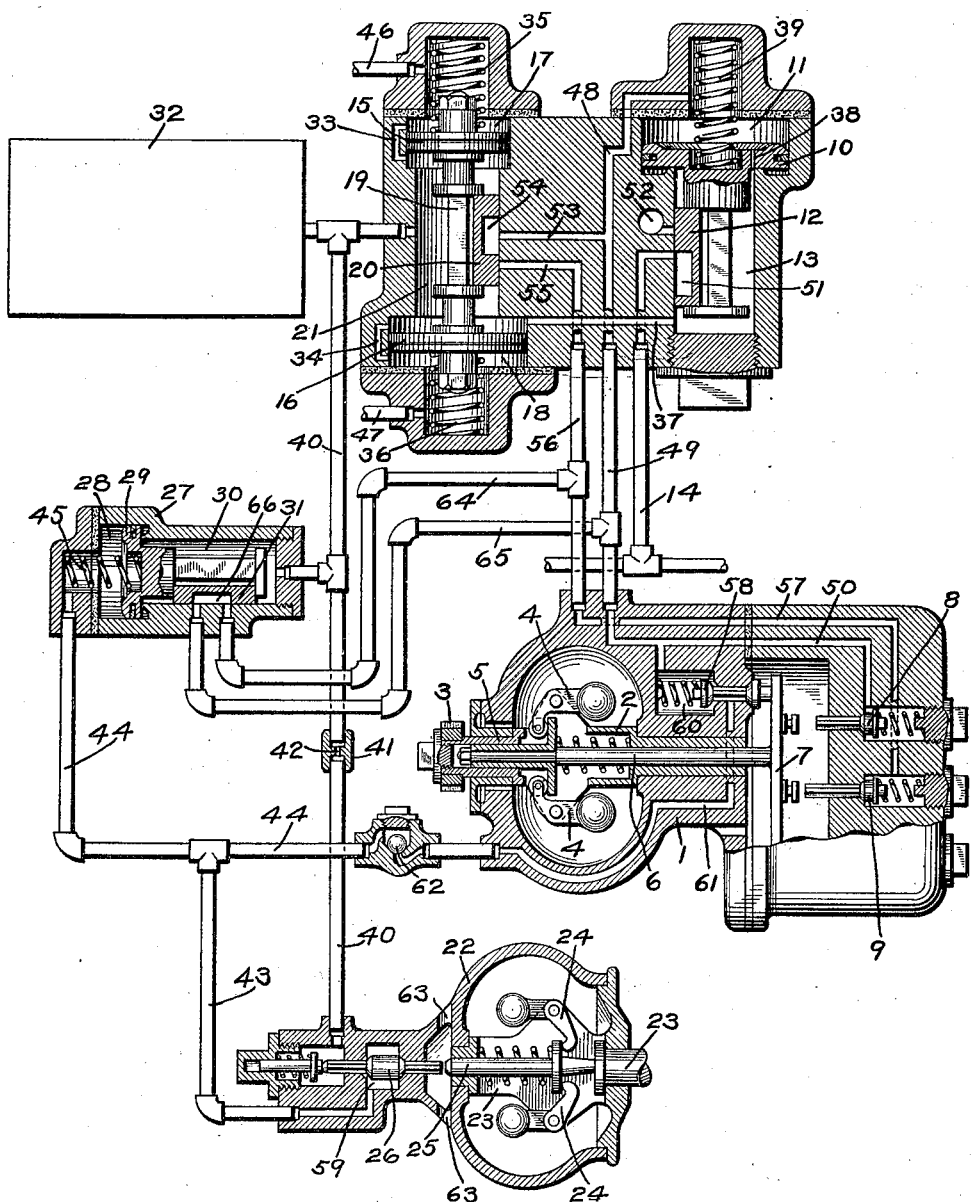
INVENTOR
THOMAS H. THOMAS
BY Wm. M. Cady
ATTORNEY Patented June 10, 1924.

1,496,955

UNITED STATES PATENT OFFICE.

THOMAS H. THOMAS, OF EDGEWOOD, PENNSYLVANIA, ASSIGNOR TO WESTINGHOUSE AIR BRAKE COMPANY, OF WILMERDING, PENNSYLVANIA, A CORPORATION OF PENNSYLVANIA.

AUTOMATIC TRAIN-SPEED-CONTROL APPARATUS.

Application filed July 14, 1923. Serial No. 651,618.

*To all whom it may concern:*

Be it known that I, THOMAS H. THOMAS, a citizen of the United States, residing at Edgewood, in the county of Allegheny and State of Pennsylvania, have invented new and useful Improvements in Automatic Train-Speed-Control Apparatus, of which the following is a specification.

This invention relates to automatic train speed controlling apparatus for limiting the speed of the train in accordance with the traffic conditions.

It has heretofore been proposed to provide a train speed control equipment in which a centrifugal speed governor is employed. The speed governor is operatively connected to a vehicle axle, so as to rotate at a speed in proportion to the speed of the vehicle and the governor is adapted to operate means by which the speed of the train is controlled in accordance with the train speed limit which may be imposed on the train.

In order to guard against failure of the speed governor to respond to the speed of the train, due to various causes, such as a broken part, it has also been proposed to provide an auxiliary speed governor which is operatively interlocked with the main speed governor, so that in case the main speed governor should fail, the auxiliary governor will be effective to operate means for reducing the speed of the train to within a safe speed limit.

Where the auxiliary speed governor is employed, there is a possibility that the auxiliary speed governor may fail to operate as intended, so that at the time the main speed governor fails, the auxiliary governor may also be out of order and thus the safety feature would be lost.

The principal object of my invention is to provide additional safety means operative upon failure of the auxiliary governor for limiting the speed of the train.

In the accompanying drawing, the single figure is a diagrammatic sectional view of a train speed control apparatus showing my invention applied thereto.

As shown in the drawing, the main speed governor device may comprise a casing 1 having bearings for a hollow governor shaft 2, a pinion 3 being secured to the extended end of said shaft for cooperation with a gear (not shown), rotatable with the car or locomotive axle, so that the shaft 2 is rotated at a speed proportional to the speed of the train. Pivotally mounted on the shaft 2 are governor ball arms 4 adapted, as the arms are thrown out by centrifugal force, to engage a flanged sleeve 5 and move same toward the right.

Operated by the movement of sleeve 5 is a shaft 6 having a cross head 7 which is adapted to successively engage the projecting stems of a plurality of speed controlling valves, a high speed valve 8 and a low speed valve 9 being shown in the drawing.

A brake application valve device is provided comprising a piston 10 contained in piston chamber 11 and a slide valve 12 contained in valve chamber 13 and adapted to be operated by piston 10 for effecting a reduction in pressure in the brake pipe 14 so as to cause an application of the brakes.

A change speed valve device is also provided comprising differential piston heads 15 and 16 contained in the respective piston chambers 17 and 18 and connected by a stem 19, and a slide valve 20 contained in valve chamber 21 intermediate said pistons and operable by the movement of the differential pistons.

The auxiliary speed governor may comprise a casing 22 containing a centrifugal governor comprising a shaft 23 operatively connected to an axle of the vehicle, so as to rotate at a speed proportional to the speed of the vehicle, said shaft carrying governor ball arms 24 for operating a spindle 25, when the arms are thrown out by centrifugal action as the shaft 23 rotates, the movement of spindle 25 being adapted to operate a double beat valve 26.

In addition to the above parts, a valve device is provided comprising a casing 27 having a piston chamber 28 containing a piston 29 and a valve chamber 30 containing a slide valve 31 adapted to be operated by piston 29.

In operation, the valve chamber 21 of the change speed valve device is charged with fluid under pressure from the main reservoir 32 or other source of fluid pressure, and with the valve device in its high speed position, as shown in the drawing, piston chamber 17 is charged with fluid under pressure from valve chamber 21 through a feed groove 33 and piston chamber 18 through a feed groove 34. Springs 35 and 36, acting on the respective pistons 15 and 16, tend to maintain the pistons in the high speed position.

Valve chamber 13 of the application valve device is charged with fluid under pressure from valve chamber 21 through a passage 37, and fluid in valve chamber 13 equalizes through restricted port 38 in piston 10 to piston chamber 11. Fluid pressures on opposite sides of piston 10 being equalized, the spring 39 holds the piston 10 in its release position, as shown in the drawing.

The valve chamber 30 of the additional valve device 27 is charged with fluid from the main reservoir 32 through pipe 40 and if the auxiliary speed governor 22 is not rotating or is rotating at a speed corresponding with a predetermined low speed of the train, such as fifteen miles per hour, the double beat valve 26 will assume the position shown in the drawing, in which communication is opened from pipe 40 through a choke plug 41 having a restricted passage 42, past the double beat valve 26 to pipe 43 and thence through pipe 44 to piston chamber 28, thus charging said piston chamber with fluid under pressure. The fluid pressures on opposite sides of piston 29 being thus equalized, the spring 45 holds the piston 29 in the position shown in the drawing.

In normal operation, the position of the change speed valve device is determined by operation of apparatus (not shown) which is controlled according to the traffic conditions.

If the speed control apparatus is set for high speed, communication through pipes 46 and 47 is blanked, so that fluid pressures equalize on opposite sides of the pistons 15 and 16, permitting the springs 35 and 36 to maintain the change speed valve device in its high speed position, as shown in the drawing.

With the main governor operating as intended, should the speed of the train exceed the predetermined high speed limit, such as a speed limit of sixty-five miles per hour, the cross head 7 will be moved out by operation of the governor so as to engage the stem of the high speed valve 8 and open said valve. Fluid is then vented from piston chamber 11 of the application valve device, through passage 48, pipe 49, and passage 50, so that the piston 10 is operated to shift slide valve 12 to its application position, in which the brake pipe 14 is connected through cavity 51 with exhaust port 52. The reduction in brake pipe pressure thus produced effects an application of the brakes in the usual manner, so that the speed of the train is reduced.

If the speed control apparatus is set for low speed, fluid will be vented from piston chamber 18 through pipe 47 and the differential pistons will be shifted to the lower position, in which application piston chamber 11 is connected to the low speed valve 9 through passage 53, cavity 54 in slide valve 20, passage 55, pipe 56, and passage 57.

If, under the above conditions, the speed of the train should exceed the predetermined low speed limit, such as twenty miles per hour, the cross head 7 will be moved out sufficiently to open the low speed valve 9 and thus vent fluid from the piston chamber 11, so that the application valve device is operated to effect an application of the brakes and thus reduce the speed of the train.

If, for any reason, the main speed governor should become inoperative and should fail to rotate, or should rotate at a speed corresponding with a train speed of less than ten miles per hour, for example, the cross head 7 will be moved to the left sufficiently to open a valve 58. With valve 58 open, communication is established from piston chamber 11 to chamber 59 of the auxiliary governor device, through passage 48, pipe 49, passage 50 to valve chamber 60 and thence through passage 61, and pipe 44, containing a non-return check valve 62 to pipe 53 and chamber 59.

The auxiliary speed governor is so adjusted that if the speed of the train exceeds a predetermined low speed limit, such as a limit of fifteen miles per hour, the governor will operate the double beat valve 26, so that communication is opened from chamber 59 to atmospheric exhaust ports 63. Consequently, if the speed of the train is above the speed limit of fifteen miles per hour when the main speed governor fails, the auxiliary speed governor 22 will operate to vent fluid from piston chamber 11 of the application valve device, so that said valve device is operated to effect an application of the brakes and thus reduce the speed of the train.

If the auxiliary speed governor is rotating as intended in proportion to the speed of the train, so long as the speed of the train exceeds the speed limit of fifteen miles per hour, or other low speed limit for which the speed governor may be adjusted, the double beat valve 26 will be maintained in its seated position at the left, so that communication from supply pipe 40 to piston chamber 28 is cut off, while pipe 43 is connected to the exhaust ports 63. Fluid will thus be vented from piston chamber 28, so that piston 29 will be moved to its extreme left hand position closing communication from pipe 64 to pipe 65. With the slide valve 31 so positioned, the speed control apparatus operates in the usual manner, according to the position assumed by the change speed valve device and the speed of the train.

If the auxiliary governor should fail, so that the governor does not rotate, or the parts rotate at a speed less than that corresponding with a train speed of fifteen miles per hour, the double beat valve 26 will be permitted to assume the position shown in the drawing, in which fluid under pressure is supplied from pipe 40 to pipe 43 and thence through pipe 44 to piston chamber 28. The fluid pressures on opposite sides of piston 29 being thus balanced, the spring 45 will shift piston 29 to its inner position, in which slide valve 31 connects pipe 64 with pipe 65, through cavity 66. It will now be seen that the piston chamber 11 of the application valve device is connected directly to the low speed valve 9, regardless of the position of the change speed valve device, through passage 48, pipe 49, pipe 65, cavity 66, pipe 64, pipe 56, and passage 57. Consequently, if the speed of the train exceeds the low speed limit of twenty miles per hour, or whatever low speed limit at which the valve 9 is adapted to open, said valve will be opened to vent fluid from piston chamber 11 and thus cause the operation of the application valve device to vent fluid from the brake pipe and effect an application of the brakes.

It will now be seen that with my improvement, should the auxiliary speed governor fail at any time, connections will be made, so that the speed of the train will be at once reduced to a safe low speed limit.

Whenever the operation of the auxiliary speed governor causes a movement of the double beat valve 26 from its right hand seated position to its left hand seated position, or vice versa, there is a time interval in which communication is open from supply pipe 40 to the exhaust ports 63, and in order to prevent a heavy discharge and waste of fluid from the main reservoir 32, the choke plug 41 is interposed in pipe 40, so that under such conditions, the loss of main reservoir pressure will be minimized.

Having now described my invention, what I claim as new and desire to secure by Letters Patent, is:—

1. In a train speed control apparatus, the combination with a main speed governor device responsive to the train speed for regulating the speed of the train and an auxiliary speed governor device operative upon failure of the main speed governor device for limiting the speed of the train, of means operative upon failure of the auxiliary speed governor device for limiting the speed of the train.

2. In a train speed control apparatus, the combination with a main speed governor device responsive to the train speed for regulating the speed of the train, of an auxiliary speed governor device and means controlled by said auxiliary speed governor for limiting the speed of the train upon failure of either the main or the auxiliary governor.

3. In a train speed control apparatus, the combination with a fluid pressure controlled valve device operative to limit the speed of the train, a main speed governor responsive to the train speed for controlling the fluid pressure on said valve device, and an auxiliary speed governor operative upon failure of the main speed governor for limiting the speed of the train, of means operative upon failure of the auxiliary speed governor for establishing communication through which the main governor controls the fluid pressure on said valve device.

4. In a train speed control apparatus, the combination with a main speed governor, means controlled by said governor for effecting an application of the brakes if the speed of the train exceeds a predetermined speed limit, an auxiliary speed governor, and means controlled by said auxiliary speed governor for effecting an application of the brakes upon failure of the main speed governor if the speed of the train exceeds a predetermined speed limit, of means operative upon failure of the auxiliary speed governor for effecting an application of the brakes if the speed of the train exceeds a predetermined speed limit.

5. In a train speed control apparatus, the combination with a valve device for effecting an application of the brakes and a main speed governor device for controlling the operation of said application valve device, of an auxiliary speed governor device and a valve device operated upon failure of the auxiliary speed governor device for establishing communication from said application valve device to said main speed governor device.

In testimony whereof I have hereunto set my hand.

THOMAS H. THOMAS.